United States Patent
Hong et al.

(10) Patent No.: US 9,040,323 B2
(45) Date of Patent: May 26, 2015

(54) DISPLAY DEVICE AND FABRICATING METHOD THEREOF

(75) Inventors: Jungmoo Hong, Seoul (KR); Hyundae Lee, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 181 days.

(21) Appl. No.: 13/607,002

(22) Filed: Sep. 7, 2012

(65) Prior Publication Data

US 2013/0264595 A1    Oct. 10, 2013

(30) Foreign Application Priority Data

Apr. 10, 2012    (KR) .................. 10-2012-0037505

(51) Int. Cl.
| | |
|---|---|
| *H01L 33/60* | (2010.01) |
| *H01L 33/22* | (2010.01) |
| *G02B 26/02* | (2006.01) |
| *G02B 26/00* | (2006.01) |
| *H01L 21/283* | (2006.01) |
| *G09G 3/34* | (2006.01) |

(52) U.S. Cl.
CPC ................ *G02B 26/02* (2013.01); *G09G 3/348* (2013.01); *G02B 26/005* (2013.01)

(58) Field of Classification Search
CPC ..... H01L 31/18; H01L 21/64; H01L 27/3244; H01L 29/66742; H01L 33/52; H01L 51/0023; H01L 51/56
USPC ........................ 257/91, 40, 71, 72; 438/29, 34
See application file for complete search history.

(56) References Cited

U.S. PATENT DOCUMENTS

| | | | |
|---|---|---|---|
| 6,449,081 B1 | 9/2002 | Onuki et al. | |
| 6,803,174 B2 * | 10/2004 | Jang et al. ...................... | 430/321 |
| 6,853,421 B2 | 2/2005 | Sakamoto et al. | |
| 6,940,572 B2 | 9/2005 | Kang et al. | |
| 6,947,103 B2 * | 9/2005 | Sakurai et al. .................. | 349/43 |
| 7,176,995 B2 | 2/2007 | Jang et al. | |
| 7,505,098 B2 | 3/2009 | Nakamura et al. | |
| 7,593,075 B2 | 9/2009 | Kudou et al. | |
| 7,636,187 B2 | 12/2009 | Morozumi et al. | |
| 7,839,558 B2 | 11/2010 | Cheng et al. | |
| 7,847,996 B2 | 12/2010 | Chen et al. | |

(Continued)

FOREIGN PATENT DOCUMENTS

| | | | |
|---|---|---|---|
| JP | 63308323 A | * | 12/1988 |
| KR | 1020040078304 | | 9/2004 |

(Continued)

OTHER PUBLICATIONS

Segal, Search Report, 2014, STIC Database Tracking No. 458430, pp. 1-6.*

*Primary Examiner* — Julia Slutsker
*Assistant Examiner* — Natalia Gondarenko
(74) *Attorney, Agent, or Firm* — H.C. Park & Associates, PLC

(57) ABSTRACT

Pixels of a display device include a first substrate, an organic insulation layer disposed on the first substrate and having an upper surface formed in an uneven structure, an inorganic insulation layer disposed on the organic insulation layer and formed in the uneven structure, a first electrode disposed on the inorganic insulation layer and formed in the uneven structure, and a device to provide a data voltage to the first electrode, in which the first electrode includes a reflective electrode to reflect incident light.

13 Claims, 10 Drawing Sheets

(56) References Cited

U.S. PATENT DOCUMENTS

| | | |
|---|---|---|
| 7,872,790 B2 | 1/2011 | Steckl et al. |
| 2003/0138727 A1* | 7/2003 | Kawabe et al. ............ 430/270.1 |
| 2004/0125288 A1 | 7/2004 | Jeong et al. |
| 2004/0239845 A1* | 12/2004 | Choi ............................. 349/113 |
| 2007/0057260 A1* | 3/2007 | Lee ................................ 257/72 |
| 2008/0061446 A1* | 3/2008 | You .............................. 257/774 |
| 2009/0261331 A1* | 10/2009 | Yang et al. ...................... 257/57 |
| 2010/0157410 A1* | 6/2010 | Kim et al. .................... 359/291 |
| 2010/0331439 A1* | 12/2010 | Heo et al. ....................... 522/92 |
| 2012/0112225 A1* | 5/2012 | Le Bellac et al. .............. 257/98 |

FOREIGN PATENT DOCUMENTS

| | | |
|---|---|---|
| KR | 1020050070243 | 7/2005 |
| KR | 1020060081586 | 7/2006 |
| KR | 1020060111742 | 10/2006 |
| WO | WO 2010112789 A2 * | 10/2010 |

\* cited by examiner

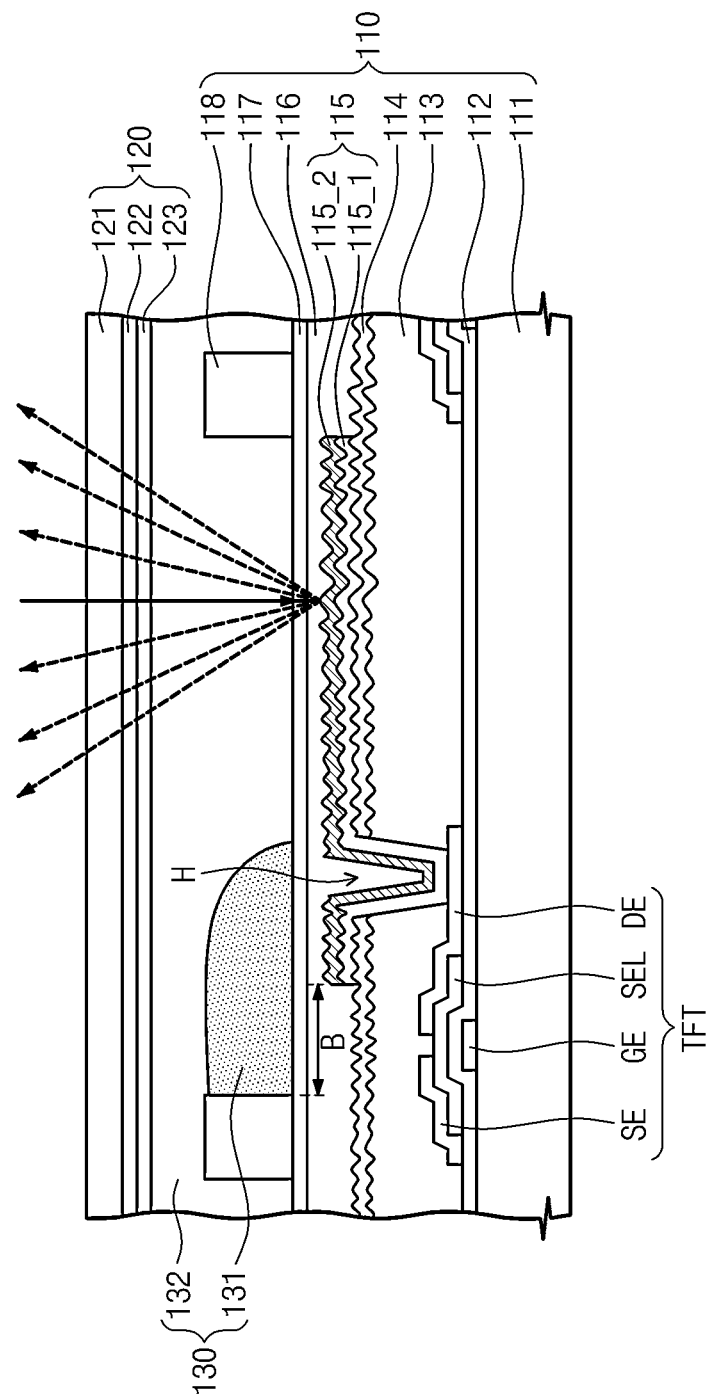

DISPLAY DEVICE AND FABRICATING METHOD THEREOF

CROSS-REFERENCE TO RELATED APPLICATIONS

This application claims priority from and the benefit of Korean Patent Application No. 10-2012-0037505, filed on Apr. 10, 2012, which is hereby incorporated by reference for all purposes as if fully set forth herein.

BACKGROUND

1. Field

The present disclosure relates to a display device and a fabricating method thereof, and more particularly, to a display device able to increase reflectance and visibility and simplify a process, and a fabricating method thereof.

2. Discussion of the Background

Recently, various display devices, such as a liquid crystal display, an organic light is emitting diode display, an electrowetting display device, a plasma display panel (PDP), and an electrophoretic display device, have been developed.

The electrowetting display device, which has lower power consumption and higher visibility in comparison to the liquid crystal display (LCD), has been in the spot light among these display devices.

The electrowetting display device may change surface tension of a fluid by applying a voltage to an aqueous liquid as an electrolyte and thus, may cause movement or deformation of the fluid. The electrowetting display device is driven through a method of displaying images by reflecting or transmitting light incoming from the outside according to the movement of the fluid.

The above information disclosed in this Background section is only for enhancement of understanding of the background of the invention and therefore it may contain information that does not form any part of the prior art nor what the prior art may suggest to a person of ordinary skill in the art.

SUMMARY

The present disclosure provides a display device that may have increased reflectance and visibility and that may be manufactured using a simpler process, and a fabricating method thereof.

Additional features of the invention will be set forth in the description which follows, and in part will be apparent from the description, or may be learned by practice of the invention.

An exemplary embodiment of the present invention discloses a display device is including a plurality of pixels configured to display an image. Each pixel includes a first substrate; an organic insulation layer disposed on the first substrate and having an upper surface formed in an uneven structure; an inorganic insulation layer disposed on the organic insulation layer and having an upper surface formed in the uneven structure; a first electrode disposed on the inorganic insulation layer and having an upper surface formed in the uneven structure; and a device configured to provide a data voltage to the first electrode. The first electrode includes a reflective electrode configured to reflect incident light.

An exemplary embodiment of the present invention also discloses a method of fabricating a display device including a plurality of pixels. The method includes forming an organic insulation layer on a first substrate; forming an inorganic insulation layer on the organic insulation layer, thereby forming an uneven structure in an upper surface of the organic insulation layer, the inorganic insulation layer being formed with the uneven structure in an upper surface of the inorganic insulation layer; and forming a first electrode on the inorganic insulation layer, an upper surface of the first electrode being formed with the uneven structure. The forming of the first electrode includes forming a reflective electrode.

An exemplary embodiment of the present invention also discloses another method of fabricating a display device including a plurality of pixels. The method includes forming a first insulation layer on a first substrate; forming a second insulation layer on the first insulation layer, thereby roughing an upper surface of the first insulation layer; and forming a conductive material on the second insulation layer. An upper surface of the conductive material and an upper surface of the second insulation layer have a roughened upper surface that corresponds to the roughened upper surface of the first insulation layer, and a root mean square roughness value of the roughened upper surface of the first insulation layer is in a range of about 10 nm to about 200 nm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 4 illustrates an operation of the pixel shown in FIG. 2 according to an application of a voltage.

DETAILED DESCRIPTION OF THE ILLUSTRATED EMBODIMENTS

Figure 1:
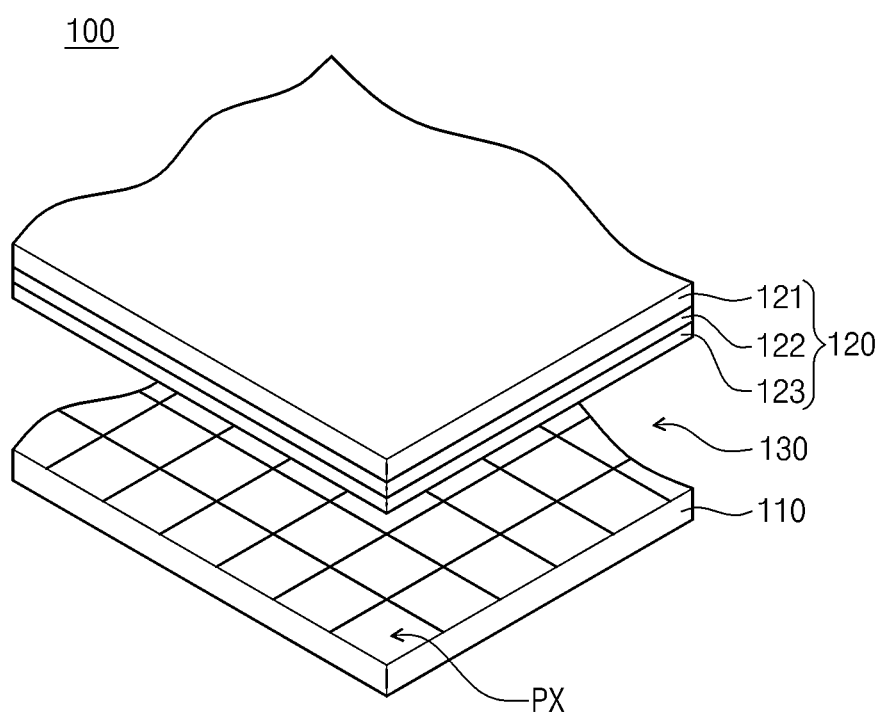
FIG. 1 is a perspective view illustrating a display device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a perspective view illustrating a display device according to an exemplary embodiment of the present invention.

Referring to FIG. 1, a display device 100 includes a first substrate 110 in which each region of a plurality of pixels PXs arranged in a matrix form is defined, a second substrate 120 facing the first substrate 110, and an electrowetting layer 130 disposed between the first substrate 110 and the second substrate 120.

Figure 2:
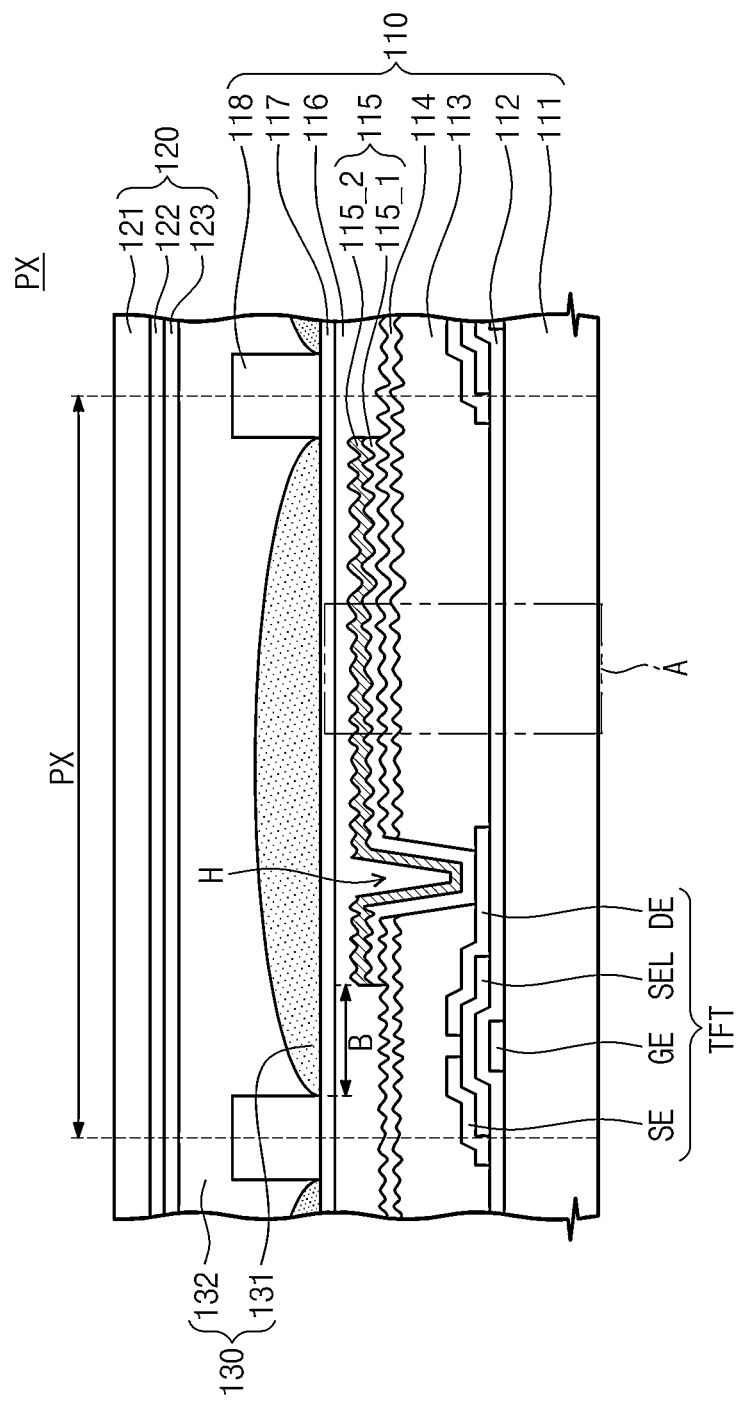
FIG. 2 is a cross-sectional view illustrating a random single pixel shown in FIG. 1.
Figure 3:
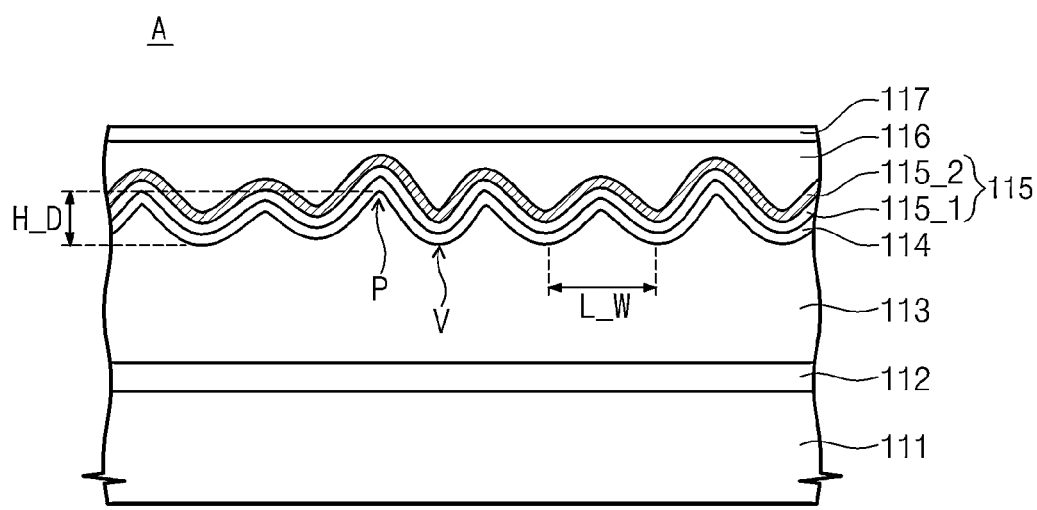
FIG. 3 is an enlarged view of region A shown in FIG. 2.

FIG. 2 is a cross-sectional view illustrating a random single pixel shown in FIG. 1, and FIG. 3 is an enlarged view of region A shown in FIG. 2.

Since the pixels shown in FIG. 1 have the same configuration, a cross section of a single pixel PX among the pixels PXs is only shown in FIG. 2. FIG. 3 is an enlarged view illustrating an uneven structure shown in FIG. 2 for specifically describing the uneven structure.

Referring to FIG. 2 and FIG. 3, the first substrate 110 includes a base substrate 111, electronic devices, such as a switching element, a gate dielectric 112, an organic insulation layer 113, an inorganic insulation layer 114, a first electrode 115, an insulation layer 116, a hydrophobic layer 117, and a partition wall 118. The first electrode 115 includes a transparent conductive layer 115_1 and a reflective electrode 115_2.

The pixel PX in FIG. 2 shows a pixel of a reflective-type display device as an example. Although not shown in FIG. 2 and FIG. 3, with respect to the reflective-type display device, the first electrode 115 may only include the reflective electrode 115_2 without including the transparent conductive layer 115_1. Furthermore, although not shown in FIG. 2 and FIG. 3, the first electrode 115 may be formed by forming the transparent conductive layer 115_1 on the reflective electrode 115_2.

The second substrate 120 includes a second base substrate 121, a color filter 122, and a common electrode 123.

A side range of the pixel PX may be defined by a region between two dotted lines shown in FIG. 2. Therefore, as shown in FIG. 2, each region of the pixels PXs may be commonly shared by the first substrate 110 and the second substrate 120. Also, the pixel PX shown in FIG. 2 may be defined by a configuration including the first substrate 110 and the second substrate 120 facing each other, and the electrowetting layer 130 included between the first and second substrates 110 and 120. Further, since each region of the pixels PXs may be commonly shared by the first substrate 110 and the second substrate 120, each region of the is pixels PXs may be defined on the first base substrate 111.

The first base substrate 111 and the second base substrate 121 face each other. The first base substrate 111 and the second base substrate 121 may be formed of a transparent insulating material. For example, the first base substrate 111 and the second base substrate 121 may be formed of glass or a polymer, such as plastic.

When the first base substrate 111 and the second base substrate 121 are formed of a plastic substrate, the first base substrate 111 and the second base substrate 121 may be formed of polyethylene terephthalate (PET), fiber-reinforced plastic, or polyethylene naphthalate (PEN). Also, when the first base substrate 111 and the second base substrate 121 are formed of a plastic substrate, realization of a flexible display may be possible.

The switching element may be formed of a thin film transistor (TFT) disposed on the first base substrate 111. Although not shown in FIG. 2, the pixel PX includes a gate line that receives a gate signal and a data line that receives a data voltage. The TFT includes a gate electrode GE branched from the gate line, a source electrode SE branched from the data line, and a drain electrode DE spaced apart from the source electrode SE and electrically connected to the first electrode 115.

The TFT is turned on by the gate signal provided through the gate line, and the turned on TFT applies a data voltage provided through the data line to the first electrode 115.

The gate electrode GE of the TFT is disposed on the first base substrate 111. The gate dielectric 112 is disposed on the first base substrate 111 so as to cover the gate electrode GE. A semiconductor layer SEL is disposed on the gate dielectric 112 covering the gate electrode GE. Although not shown in FIG. 2, the semiconductor layer SEL may include an active layer and an ohmic contact layer. The source electrode SE and the drain electrode DE of is the TFT are spaced apart from each other and disposed on the semiconductor layer SEL and the gate dielectric 112.

The organic insulation layer 113 is disposed on the first base substrate 111 so as to cover the TFT and the gate dielectric 112. An upper surface of the organic insulation layer 113 (an upper surface of the organic insulation layer in FIG. 2) is formed in an uneven structure.

As shown in FIG. 3, the uneven structure of the upper surface of the organic insulation layer 113 includes a plurality of protrusions P and a plurality of valleys V. A difference in heights of the protrusions P and the valleys V may be defined as a height difference H_D, and a spacing between the adjacent valleys V may be defined as a line width L_W.

The protrusions P are irregularly formed and thus, may have different heights from each other. Also, the valleys V are irregularly formed and thus, may have different heights from each other. The heights of the protrusions P and the valleys V may be defined as heights from a lower surface of the organic insulation layer 113.

Since the protrusions P and the valleys V may have different heights from each other, the height difference H_D of the protrusions P and the valleys V may have a plurality of values. A maximum value of the height difference H_D of the protrusions P and the valleys V may be about 500 nm (or 5000 Å). That is, the height difference H_D of the protrusions P and the valleys V may be equal to or less than about 500 nm.

Also, since the valleys V are irregularly formed to have different heights, the line width L_W of the adjacent valleys V may have a plurality of values. A maximum value of the line width L_W of the adjacent valleys V may be about 3 μm. That is, the line width L_W of the adjacent valleys V may be equal to or less than about 3 μm.

A root mean square (RMS) roughness value of the uneven structure may be in a is range of about 10 nm to about 200 nm. The RMS roughness may be defined as a degree of micro unevenness generated on a surface, i.e., a degree of roughness.

A cross section of the unevenness may be denoted as a curve (hereinafter, referred to as a "RMS roughness curve"). A difference in heights between a lowest position and a highest position of the RMS roughness curve may be defined as a roughness and generally denoted as Rmax. Also, the RMS roughness may be denoted as an average of absolute values of heights at both sides of center line RMS denoting a square mean value of an average value of the RMS roughness curve.

The organic insulation layer 113 may be formed by curing a suitable organic insulation material. For example, the organic insulation material may include methyl-3-methoxypropionate (MMP), dipropylene glycol dimethyl ether (DPM), an acrylic polymer, an acrylic monomer, a photoinitiator, and alkoxysilane.

The inorganic insulation layer 114 is disposed on the organic insulation layer 113. When the inorganic insulation layer 114 is formed on the organic insulation layer 113, stress is provided to the organic insulation layer 113 by process conditions. The upper surface of the organic insulation layer 113 is formed in an uneven structure by stress generated during deposition of the inorganic insulation layer 114. That is, an interface between the organic insulation layer 113 and the inorganic insulation layer 114 is formed in the uneven structure.

When the inorganic insulation layer 114 is formed on the organic insulation layer 113, there are three process conditions controlling the stress. Specifically, the three process conditions are a formation temperature of the inorganic insulation layer 114, a thickness of the inorganic insulation layer 114, and a formation rate (hereinafter, referred to as "deposition rate") of the inorganic insulation layer 114. That is, a size of the unevenness of the organic insulation is layer 113 is determined according to the formation temperature of the inorganic insulation layer 114, the thickness of the inorganic insulation layer 114, and the deposition rate of the inorganic insulation layer 114.

Specifically, stress provided to the organic insulation layer 113 increases as the formation temperature of the inorganic insulation layer 114 is higher, the thickness of the inorganic insulation layer 114 is higher, and the deposition rate of the inorganic insulation layer 114 is lower. The height difference H_D of the unevenness of the organic insulation layer 113 increases in proportion to the stress.

For example, the higher the formation temperature of the inorganic insulation layer 114 is, the higher the stress provided to the organic insulation layer 113 is and the larger the height difference H_D of the uneven structure formed on the upper surface of the organic insulation layer 113 is.

The higher the thickness of the inorganic insulation layer 114 disposed on the organic insulation layer 113 is, the higher the stress provided to the organic insulation layer 113 is and the larger the height difference H_D of the uneven structure formed on the upper surface of the organic insulation layer 113 is.

The lower the deposition rate of the inorganic insulation layer 114 disposed on the organic insulation layer 113 is, the higher the stress provided to the organic insulation layer 113 is and the larger the height difference H_D of the uneven structure formed on the upper surface of the organic insulation layer 113 is.

An application time of the formation temperature of the inorganic insulation layer 114 may be set as a time for the inorganic insulation layer 114 to be deposited to a set height.

Since the inorganic insulation layer 114 is disposed on the organic insulation layer 113 having the upper surface formed in an uneven structure, the inorganic insulation layer 114 may be formed in the same uneven structure as that of the organic insulation layer 113. The inorganic insulation layer 114 may be formed of a suitable inorganic insulating material. For example, the inorganic insulation layer 114 may be formed of a silicon nitride ($SiN_x$) layer.

The first electrode 115 is disposed on the inorganic insulation layer 114. A first region B of the pixel PX shown in FIG. 2 is a region in which the first electrode 115 is not formed. Since the first electrode 115 is disposed on the organic insulation layer 113 and the inorganic insulation layer 114 having the uneven structure, the first electrode 115 may be formed in the same uneven structure as that of the organic insulation layer 113.

Therefore, the transparent conductive layer 115_1 of the first electrode 115 is disposed on the inorganic insulation layer 114 and may be formed in the same uneven structure as that of the organic insulation layer 113. Also, the reflective electrode 115_2 of the first electrode 115 is disposed on the transparent conductive layer 115_1 and may be formed in the same uneven structure as that of the organic insulation layer 113. The uneven structure has a light diffusing (or scattering) function.

As described above, the first electrode 115 may include only the reflective electrode 115_2 and, in this case, the reflective electrode 115_2 may be formed in the uneven structure on the inorganic insulation layer 114. As also described above, the first electrode 115 may be formed by forming the transparent conductive layer 115_1 on the reflective electrode 115_2. In this case, the reflective electrode 115_2 and the transparent conductive layer 115_1 may be formed in the uneven structure on the inorganic insulation layer 114.

The transparent conductive layer 115_1 of the first electrode 115 may be formed of a transparent conductive material. For example, the transparent conductive material may is include at least one of indium tin oxide (ITO), indium zinc oxide (IZO), a conductive polymer, and carbon nanotubes (CNTs).

The reflective electrode 115_2 of the first electrode 115 may be formed of a reflective material. For example, the reflective material may include at least one of aluminum (Al) and aluminum-neodymium (AlNd), and it may be formed in a single layer or multilayer.

The first electrode 115 is connected to the TFT through a contact hole H formed through the organic insulation layer 113 and the inorganic insulation layer 114. That is, the transparent conductive layer 115_1 and the reflective electrode 115_2 are connected to the TFT through the contact hole H.

The insulation layer 116 is disposed on the inorganic insulation layer 114 so as to cover the first electrode 115. The hydrophobic layer 117 is disposed on the insulation layer 116. The insulation layer 116 and the hydrophobic layer 117 may have planar upper surfaces, as shown in FIG. 2.

The partition wall 118 is disposed on the hydrophobic layer 117. The partition wall 118 partitions the pixels PX. The partition wall 118 may be formed of photoresist PR. Also, the partition wall 118 may be formed by patterning an insulation layer ($SiN_x$ or $SiO_x$).

The color filter 122 is disposed on the second base substrate 121. The color filter 122 may include a color pixel showing any one color of, for example, red, green, and blue. The second electrode 123 is disposed on the color filter 122. The second electrode 123 may be formed of a transparent conductive material. For example, the transparent conductive material may include indium tin oxide (ITO). The second electrode 123 is disposed to face the first electrode 115, and a common voltage is applied to the second electrode 123.

The electrowetting layer 130 is included in the each pixel PX and includes a first fluid 131 and a second fluid 132 that are immiscible with each other.

The first fluid 131 has electrical non-conductivity or non-polarity, and the second fluid 132 has electrical conductivity or polarity. Also, the first fluid 131 is hydrophobic, and the second fluid 132 is hydrophilic.

For example, the first fluid 131 may be formed of silicon oil, mineral oil, and an organic solvent such as carbon tetrachloride ($CCl_4$), and the second fluid 132 may be formed of an aqueous solution and an electrolyte material such as sodium chloride (NaCl).

The first fluid 131 may act to absorb incident light by having a black dye or being formed of a light-absorbing material. Also, the first fluid 131 may function as a light shutter by being dispersed in the entire pixel PX or moving to one side of the pixel PX. The second fluid 132 may be transparent and as a result, may transmit the incident light.

The first fluid 131 and the second fluid 132 having different polarity are immiscible with each other and in contact with each other to form a boundary. The first fluid 131 is disposed on the hydrophobic layer 117 of the each pixel PX and the second fluid 132 is disposed on the first fluid 131.

According to an exemplary embodiment of the present invention, the first fluid 131 may include a dye able to show any one color of red, green, and blue, or may be formed of a material able to show red, green, and blue. In this case, the display device 100 may not include the color filter 122. Of course, as a person having ordinary skill in the art understands, other colors are possible.

Movement of the electrowetting layer 130 is controlled by voltages respectively applied to the first electrode 115 and the second electrode 123.

FIG. 4 illustrates an operation of the pixel shown in FIG. 2 according to an is application of a voltage.

Referring to FIG. 4, since the first fluid 131 covers the hydrophobic layer 117 of each pixel PX before a data voltage is applied to the first electrode 115, each pixel PX indicates a black gradation.

The TFT is turned on by the gate signal provided through the gate line, and the turned on TFT applies a data voltage provided through the data line to the first electrode 115. As described above, a common voltage is applied to the second electrode 123. In such a case, the second fluid 132 is polarized and becomes in contact with the hydrophobic layer 117 while the second fluid 132 pushes the first fluid 131 to one side of the pixel PX.

The first fluid 131 is an organic solvent that has gathering properties. The first fluid 131 becomes gathered in a stable region while the first fluid 131 is pushed to the one side of the pixel PX by the second fluid 132.

For example, since the first region B of the pixel PX shown in FIG. 4 is a region in which the first electrode 115 is not disposed, an electric field is not formed therein. Also, a distance between the portion of the first electrode 115 formed in the contact hole H region and the second electrode 123 is larger than that between the portion of the first electrode 115 formed outside the contact hole H region and the second electrode 123.

Therefore, intensity of an electric field formed between the portion of the first electrode 115 formed in the contact hole H region and the second electrode 123 is weaker than that of an electric field formed between the portion of the first electrode 115 formed outside the contact hole H region and the second electrode 123. As a result, the first fluid 131 may be gathered in a region including the first region B and a region having the contact hole H formed therein as a stable region. That is, as shown in FIG. 4, the first fluid 131 may be gathered in a is left region of the pixel PX.

In this case, light incident through the second substrate 120 is diffused and reflected by the reflective electrode 115_2 formed in the uneven structure. The reflected light transmits through the second fluid 132 in the pixel PX region, in which the first fluid 131 is not gathered, and the light transmitted through the second fluid 132 may be viewed by an observer by transmitting through the color filter 122.

The common voltage may have a constant level, and the data voltage may correspond to the gradation to be indicated by the pixel PX. The display device 100 may indicate a gradation by controlling movements of the first and second fluids 131 and 132 according to the difference between the voltages applied to the first electrode 112 and the second electrode 123. A pushed amount of the first fluid 131 is determined by a level of the date voltage applied to the first electrode 115. That is, the pixel PX may indicate the gradation corresponding to the data voltage provided to the first electrode 115 through the TFT.

Since light incident on the pixel PX through the second substrate 200 is diffused and reflected by the reflective electrode 115_2 formed in the uneven structure, a viewing angle of the display device 100 widens.

In order to diffuse the light, the first substrate 100 may include a planarized reflective electrode and the second substrate 200 may include a diffusion film. Also, the first electrode 115 may include a separate metal layer patterned in an uneven structure by using a mask so as to diffuse the light. However, when the diffusion film is used, incident light transmits through the diffusion film and light reflected by the reflective electrode again transmits the diffusion film. Since the light transmits twice through the diffusion film, a loss of light (or a decrease in reflectance) occurs. As a result, visibility of the display device may be decreased. Also, when the metal layer is patterned to form the uneven structure, a separate mask is used.

However, the display device 100 includes the organic insulation layer 113 having the uneven structure generated by process conditions during the deposition of the inorganic insulation layer 114. Also, the inorganic insulation layer 114 having the uneven structure is disposed on the organic insulation layer 113 having the uneven structure, and the first electrode 115 having the uneven structure is disposed on the inorganic insulation layer 114. Therefore, the display device 100 may include the reflective electrode 115_2 having the uneven structure for diffusing and reflecting the incident light.

As a result, since the display device 100 according to an exemplary embodiment of the invention may diffuse and reflect the incident light without using the diffusion film, reflectance and visibility may be increased. Also, the display device 100 may be manufactured using a simpler process because a separate mask for forming the uneven structure is not used.

FIGS. 5A through 5E illustrate a method of fabricating a display device 100 according to an exemplary embodiment of the present invention.

Figure 5A:
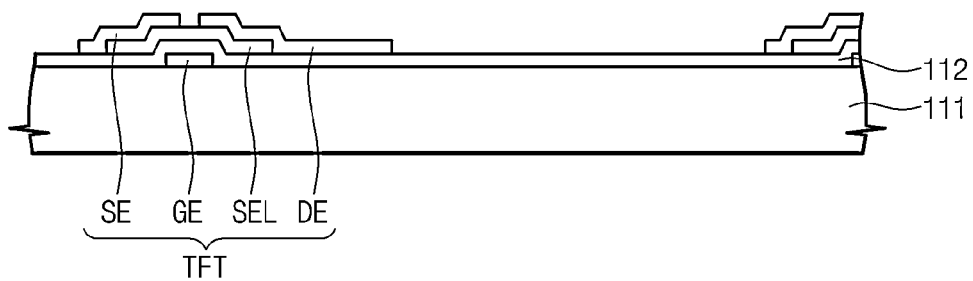
FIG. 5A, FIG. 5B, FIG. 5C, FIG. 5D, and FIG. 5E illustrate a method of fabricating a display device according to an exemplary embodiment of the present invention.
Figure 5B:
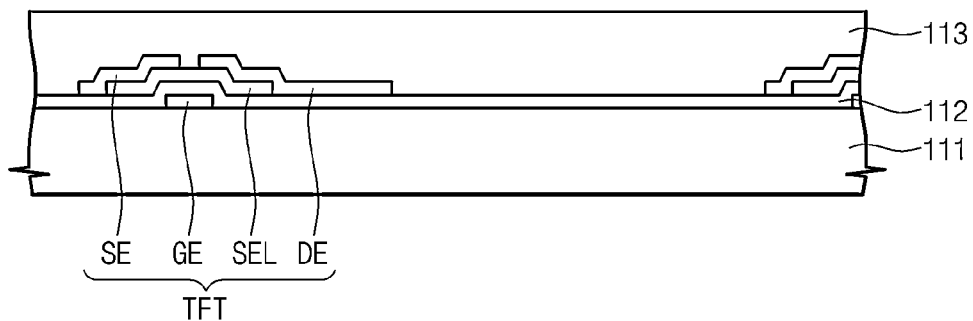

Referring to FIGS. 5A and 5B, the TFT is first formed on the first base substrate 111. The organic insulation layer 113 is formed on the first base substrate 111 to cover the TFT.

Specifically, an organic insulation material is formed on the gate dielectric 112 formed on the base substrate 111 so as to cover the TFT. The organic insulation layer 113 may be formed by curing the organic insulation material.

As described above, the organic insulation material may include methyl-3-methoxypropionate, dipropylene glycol dimethyl ether, an acrylic polymer, an acrylic monomer, a photoinitiator, and alkoxysilane.

A chemical formula of methyl-3-methoxypropionate is $CH_3OCH_2CH_2COOCH_3$ is and a chemical formula of dipropylene glycol dimethyl ether is CH₃OCH₂CH₂OCH₂CH₂OH.

A content of the methyl-3-methoxypropionate in the organic insulation material is in a range of about 65 wt % to about 75 wt %, a content of the dipropylene glycol dimethyl ether is in a range of about 10 wt % to about 20 wt %, a content of the acrylic polymer is in a range of about 1 wt % to about 10 wt %, a content of the acrylic monomer is in a range of about 1 wt % to about 10 wt %, a content of the photoinitiator is about 1 wt % or less, and a content of the alkoxysilane is about 1 wt % or less.

Figure 5C:
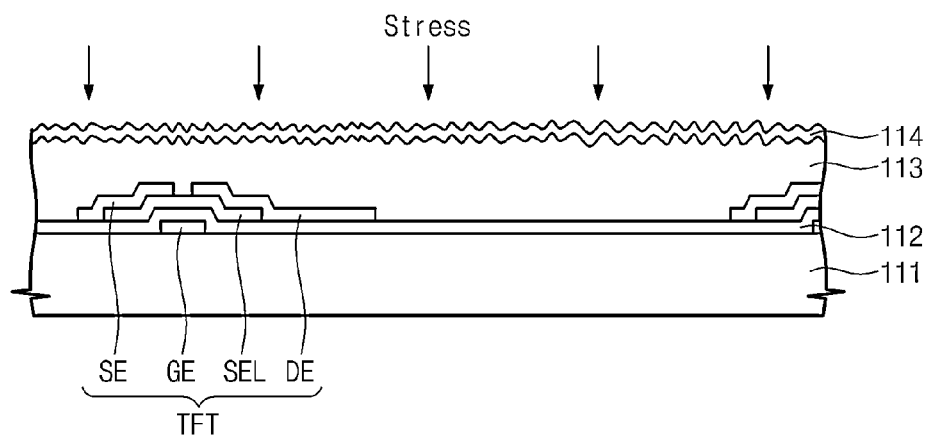

Referring to FIG. 5C, the inorganic insulation layer 114 is formed (hereinafter, referred to as "deposited") on the organic insulation layer 113. When the inorganic insulation layer 114 is deposited on the organic insulation layer 113, stress is provided to the organic insulation layer 113. An upper surface of the organic insulation layer 113 is formed in the uneven structure by the stress generated during the deposition of the inorganic insulation layer 114. A height difference of the uneven structure of the organic insulation layer 113 is proportional to the stress.

Specifically, the stress provided to the organic insulation layer 113 increases as the formation temperature of the inorganic insulation layer 114 is higher, the thickness of the inorganic insulation layer 114 is higher, and the deposition rate of the inorganic insulation layer 114 is lower. The height difference of the unevenness structure of the organic insulation layer 113 increases in proportion to the stress. That is, the height difference of the unevenness structure of the organic insulation layer 113 is proportional to the formation temperature of the inorganic insulation layer 114, is proportional to the thickness of the inorganic insulation layer 114, and is inversely proportional to the deposition rate of the inorganic insulation layer 114.

According to an exemplary embodiment of the present invention, the inorganic is insulation layer 114 may be formed within a temperature range of about 150° C. to about 245° C. The thickness of the inorganic insulation layer 114 deposited on the organic insulation layer 113 may be in a range of about 1000 angstroms (hereinafter, denoted as "Å") to about 5000 Å. The inorganic insulation layer 114 may be formed at a deposition rate ranging from about 5 Å/s to about 50 Å/s.

Under a condition having the same thickness and deposition rate of the inorganic insulation layer 114, the higher the formation temperature of the inorganic insulation layer 114 is, the higher the stress provided to the organic insulation layer 113 is. Therefore, the height difference of the uneven structure formed on the upper surface of the organic insulation layer 113 increases.

Under a condition having the same formation temperature and deposition rate of the inorganic insulation layer 114, the higher the thickness of the inorganic insulation layer 114 is, the higher the stress provided to the organic insulation layer 113 is. Therefore, the height difference of the uneven structure formed on the upper surface of the organic insulation layer 113 increases.

Under a condition having the same formation temperature and thickness of the inorganic insulation layer 114, the lower the deposition rate of the inorganic insulation layer 114 is, the higher the stress provided to the organic insulation layer 113 is. Therefore, the height difference of the uneven structure formed on the upper surface of the organic insulation layer 113 increases.

Table 1 is the result of experiments conducted by using exemplary set values within ranges of the foregoing formation temperature, thickness, and deposition rate of the inorganic insulation layer 114.

TABLE 1

| Condition | | 1 | 2 | 3 | 4 | 5 |
|---|---|---|---|---|---|---|
| Temperature | | 150° C. | 180° C. | 245° C. | 180° C. | 245° C. |
| Thickness | | 1000 Å | 1000 Å | 1000 Å | 2000 Å | 1500 Å |
| Rate | | 30 Å/s | 30 Å/s | 30 Å/s | 30 Å/s | 10 Å/s |
| Line width | | L__W < 2 μm | L__W < 2 μm | L__W < 2 μm | L__W < 2 μm | L__W < 2 μm |
| Height difference | | 5 nm-10 nm | 30 nm-60 nm | 40 nm-80 nm | 70 nm-120 nm | 100 nm-170 nm |
| Reflectance | SCI | 91.64% | 88.5% | 87.31% | 86.93% | 85.83% |
| | SCE | 1.42% | 25.67% | 37.90% | 45.11% | 61.02% |

When Conditions 2 and 3 in Table 1 are compared, thicknesses and deposition rates of the inorganic insulation layers 114 in Conditions 2 and 3 are the same values of about 1000 Å and 30 Å/s, respectively. In Condition 2, a formation temperature of the inorganic insulation layer 114 is 180° C. and a height difference of the uneven structure of the organic insulation layer 113 is in a range of about 30 nm to about 60 nm. In Condition 3, the formation temperature of the inorganic insulation layer 114 is 245° C. and the height difference of the uneven structure of the organic insulation layer 113 is in a range of about 40 nm to about 80 nm. Therefore, the higher the formation temperature of the inorganic insulation layer 114 is, the larger the height difference of the uneven structure of the organic insulation layer 113 is.

When Conditions 2 and 4 in Table 1 are compared, the formation temperatures and deposition rates of the inorganic insulation layers 114 in Conditions 2 and 4 are the same values of about 180° C. and 30 Å/s, respectively. In Condition 2, the thickness of the inorganic insulation layer 114 is 1000 Å and the height difference of the uneven structure of the organic is insulation layer 113 is in a range of about 30 nm to about 60 nm. In Condition 4, the thickness of the inorganic insulation layer 114 is 2000 Å and the height difference of the uneven structure of the organic insulation layer 113 is in a range of about 70 nm to about 120 nm. Therefore, the higher the thickness of the inorganic insulation layer 114 is, the larger the height difference of the uneven structure of the organic insulation layer 113 is.

When Conditions 3 and 5 in Table 1 are compared, the formation temperatures of the inorganic insulation layers 114 in Conditions 3 and 5 are the same value of about 245° C. In Condition 3, the thickness of the inorganic insulation layers 114 is 1000 Å, the deposition rate of the inorganic insulation layer 114 is about 30 Å/s, and the height difference of the uneven structure of the organic insulation layer 113 is in a range of about 40 nm to about 80 nm. In Condition 5, the thickness of the inorganic insulation layer 114 is 1500 Å, the deposition rate of the inorganic insulation layer 114 is about 10 Å/s, and the height difference of the uneven structure of the organic insulation layer 113 is in a range of about 100 nm to about 170 nm. Therefore, in addition to a cause of increasing the thickness of the inorganic insulation layer 114, the lower the deposition rate of the inorganic insulation layer 114 is, the higher the height difference of the uneven structure of the organic insulation layer 113 is.

Since the inorganic insulation layer 114 is formed on the organic insulation layer 113 having the upper surface formed in an uneven structure, the inorganic insulation layer 114 may be formed in the same uneven structure as that of the organic insulation layer 113.

Figure 5D:
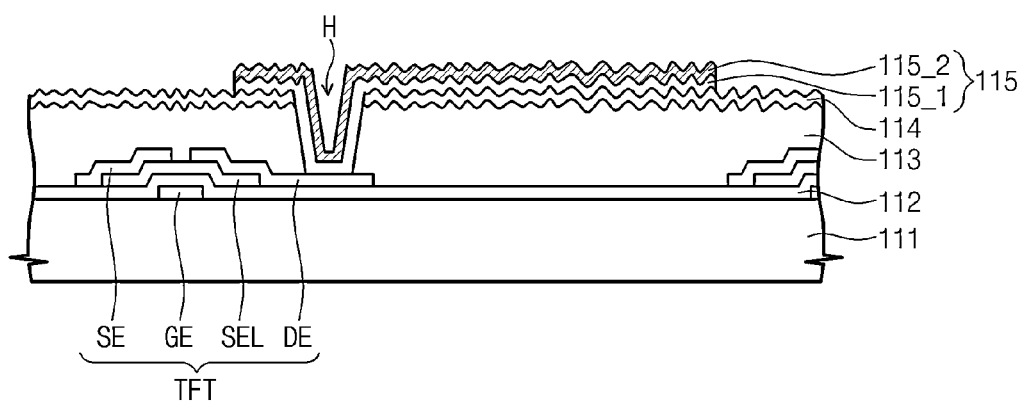
Figure 5E:
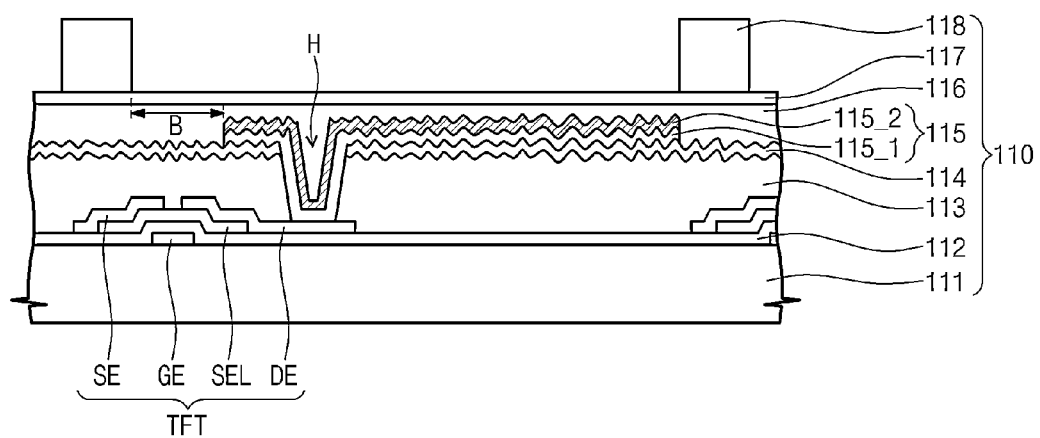

Referring to FIGS. 5D and 5E, the transparent conductive layer 115_1 of the first electrode 115 is formed on the inorganic insulation layer 114, and the reflective electrode 115_2 is formed on the transparent conductive layer 115_1. Although not show in FIGS. 5D and 5E, the first electrode 115 may first be formed on the inorganic insulation layer 114 and then may be patterned so as to correspond to the each pixel PX.

Since the transparent conductive layer 115_1 and the reflective electrode 115_2 are formed on the organic insulation layer 113 and the inorganic insulation layer 114 having the uneven structure, the transparent conductive layer 115_1 and the reflective electrode 115_2 may be formed in the same uneven structure as that of the organic insulation layer 113.

The first electrode 115 is connected to the TFT through the contact hole H formed through the organic insulation layer 113 and the inorganic insulation layer 114. The insulation layer 116 is formed on the inorganic insulation layer 114 to cover the first electrode 115. The hydrophobic layer 117 is formed on the insulation layer 116. The partition wall 118 is formed on the hydrophobic layer 117.

Although not shown in FIGS. 5A through 5E, the color filter 122 is formed on the second base substrate 121 of the second substrate 200, and the second electrode 123 is formed on the color filter 122. Also, the electrowetting layer 130 is disposed between the first substrate 100 and the second substrate 200.

Figure 6A:
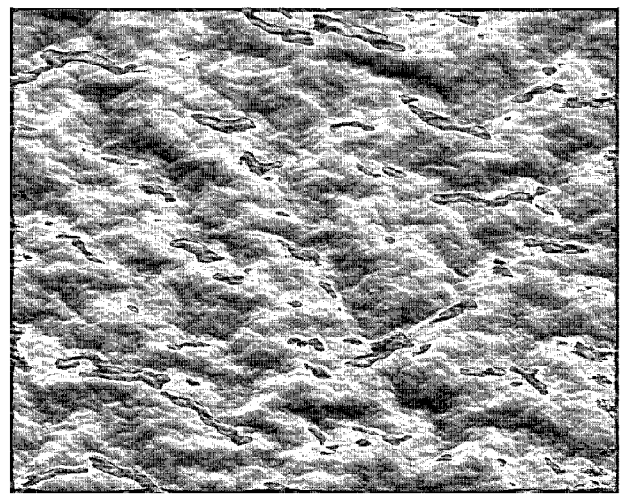
FIG. 6A and FIG. 6B illustrate an uneven structure of an organic insulation layer.
Figure 6B:
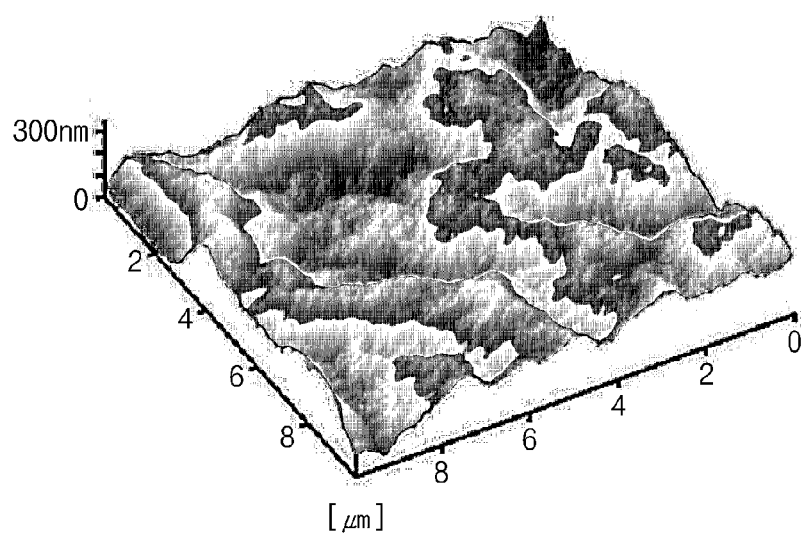

FIGS. 6A and 6B illustrate an uneven structure of an organic insulation layer. FIG. 6A is an electron micrograph of a random region of the uneven structure formed on an upper surface of the organic insulation layer, and FIG. 6B is a three-dimensional graphic drawing of the electron micrograph of the uneven structure shown in FIG. 6A.

Referring to FIGS. 6A and 6B, the uneven structure of the organic insulation layer 113 includes a plurality of protrusions and a plurality of valleys as shown in FIGS. 6A and 6B.

As described above, a height difference of the protrusions and the valleys may be is equal to or less than about 500 nm, and a line width of the adjacent valleys may be equal to or less than about 3 μm. Also, a root mean square roughness value of the uneven structure may be in a range of about 10 nm to about 200 nm.

Figure 7:
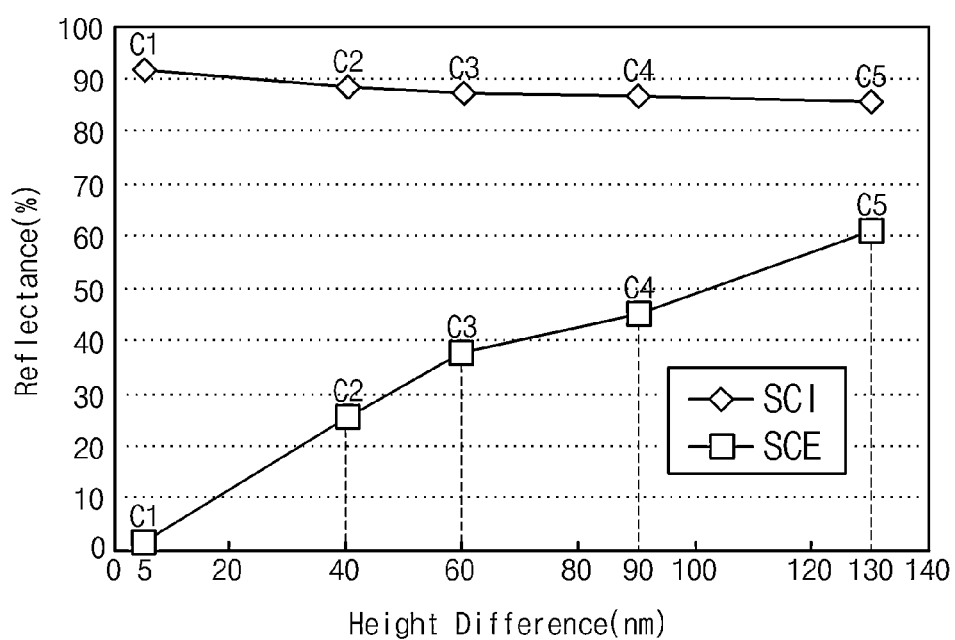
FIG. 7 is a graph showing reflectance of light reflected by a reflective layer.

FIG. 7 is a graph showing reflectance of light reflected by a reflective layer.

Referring to FIG. 7 and the foregoing Table 1, specular component included (SCI) presented in Table 1 is the result of measurements of incident and reflected straight light and diffused light. Specular component excluded (SCE) is the result of measurements of incident and reflected diffused light. Light incident and reflected in the same angle may be defined as specular light, and light scattered and reflected in various directions may be defined as diffused light.

A first condition C1 shown in FIG. 7 is the result of SCI and SCE measurements of a height difference formed by Condition 1 of Table 1. For example, the height difference formed by the first condition C1 may be about 5 nm as shown in FIG. 7.

A second condition C2 shown in FIG. 7 is the result of SCI and SCE measurements of a height difference formed by Condition 2 of Table 1. For example, the height difference formed by the second condition C2 may be about 40 nm as shown in FIG. 7.

A third condition C3 shown in FIG. 7 is the result of SCI and SCE measurements of a height difference formed by Condition 3 of Table 1. For example, the height difference formed by the third condition C3 may be about 60 nm as shown in FIG. 7.

A fourth condition C4 shown in FIG. 7 is the result of SCI and SCE measurements of a height difference formed by Condition 4 of Table 1. For example, the height difference formed by the fourth condition C4 may be about 90 nm as shown in FIG. 7.

A fifth condition C5 shown in FIG. 7 is the result of SCI and SCE measurements is of a height difference formed by Condition 5 of Table 1. For example, the height difference formed by the fifth condition C5 may be about 130 nm as shown in FIG. 7.

Referring to the SCE of Table 1, the larger the height difference of the uneven structure of the organic insulation layer 113 is, the higher the reflectance of the diffused light reflected by the reflective electrode 115_2 is. That is, although a diffusion film or metal layer patterned in an uneven structure is not used, the reflective electrode 115_2 having an uneven structure may be formed by using the uneven structure of the organic insulation layer 113. Therefore, incident light may be reflected by the reflective electrode 115_2 and may be diffused.

As a result, since the display device 100 according to exemplary embodiments of the present invention may diffuse and reflect the incident light without using the diffusion film, reflectance and visibility may be increased. Also, the display device 100 may be manufactured using a simpler process because a separate mask for forming the uneven structure is not used.

Figure 8:
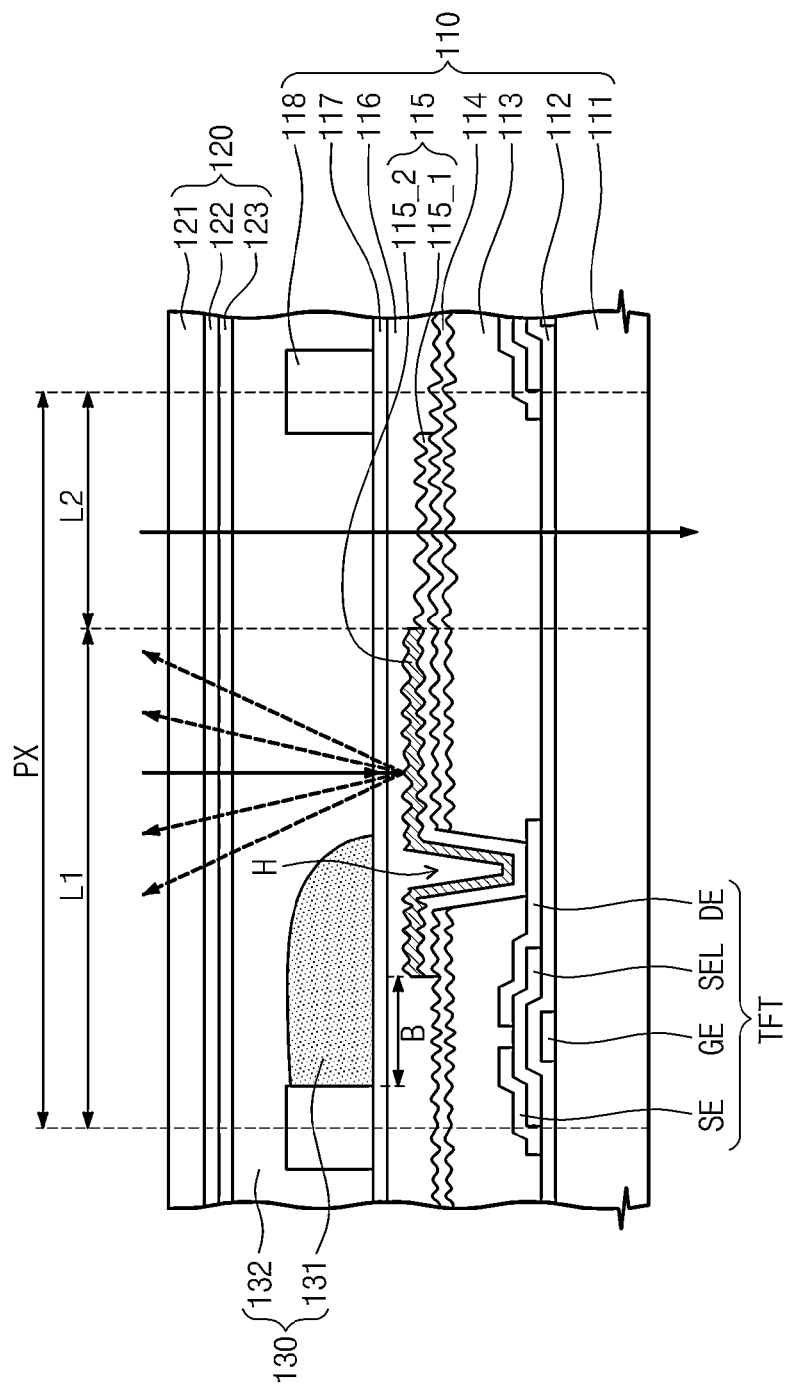
FIG. 8 is a cross-sectional view illustrating a random single pixel of a display device according to another exemplary embodiment of the present invention.

FIG. 8 is a cross-sectional view illustrating a random single pixel of a display device according to another exemplary embodiment of the present invention.

The pixel of the display device shown in FIG. 8 is a pixel of a semi-transparent type display device, which includes a reflection region and a transmission region, and has the same configuration as that of the pixel of the display device shown in FIG. 2 except a configuration in which a reflective electrode is formed in the reflection region. Therefore, the configuration of the pixel of the display device shown in FIG. 8 and the configuration of the pixel of the display device shown in FIG. 2 use the same reference numerals.

Hereinafter, the configuration of the pixel of the display device shown in FIG. 8 different from that of the pixel of the display device shown in FIG. 2 will be described.

Referring to FIG. 8, a pixel PX includes a reflection region L1 and a transmission is region L2, and a first electrode 115 includes a transparent conductive layer 115_1 and a reflective electrode 115_2. The reflective electrode 115_2 is formed on the transparent conductive layer 115_1 in the reflection region L1. Alternatively, similar to that described above, the first electrode 115 may be formed by forming the transparent conductive layer 115_1 on the reflective electrode 115_2.

As described above, since the organic insulation layer 113 and the inorganic insulation layer 114 are formed in an uneven structure, the transparent conductive layer 115_1 and the reflective electrode 115_2 are formed in the uneven structure.

When a data voltage is applied to the first electrode 115 and a common voltage is applied to the second electrode 123, the first fluid 131 is gathered at one side of the pixel. Light incident on the reflection region L1 is reflected by the reflective electrode 115_2 and diffused. Light incident on the transmission region L2 transmits the transparent conductive layer 115_1.

Therefore, the display device including the pixel shown in FIG. 8 operates in a semi-transparent type. As a result, since the display device shown in FIG. 8 may also diffuse and reflect the incident light without using a diffusion film as the display device 100 including the pixel shown in FIG. 2, reflectance and visibility may be increased. Also, the display device including the pixel shown in FIG. 8 may be manufactured using a simpler process because a separate mask for forming the uneven structure is not used.

A display device according to exemplary embodiments of the present invention may have increased reflectance and visibility and may be manufactured using a simpler process by forming a reflective electrode in the uneven structure according to process conditions.

Although the exemplary embodiments above are described in relation to an electrowetting display device, the present invention may be applied in other devices. For example, exemplary embodiments of the present invention may be applied to liquid crystal display devices, organic display devices, and any other display device that uses a reflective electrode or member to diffuse and reflect incident light.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a display device comprising a plurality of pixels, the method comprising:
   forming an organic insulation layer on a first substrate;
   stressing the organic insulation layer via deposition of an inorganic insulation layer on the organic insulation layer, stress of the deposition causing, at least in part, an uneven structure in an upper surface of the organic insulation layer, the inorganic insulation layer being formed with the uneven structure in an upper surface of the inorganic insulation layer; and
   forming a first electrode on the inorganic insulation layer, an upper surface of the first electrode being formed with the uneven structure,
   wherein the forming of the first electrode comprises forming a reflective electrode.

2. The method of claim 1, wherein the forming of the first electrode further comprises forming a transparent conductive layer on the inorganic insulation layer, the reflective electrode being formed on the transparent conductive layer.

3. The method of claim 2, wherein each pixel comprises a reflection region configured to reflect light and a transmission region configured to transmit light, and the reflective electrode is formed in the reflection region.

4. The method of claim 1, further comprising:
   forming a device in each pixel, the device being disposed between the first substrate and the organic insulation layer; and
   forming a contact hole in the organic insulation layer and the inorganic insulation layer of each pixel, wherein the device is connected to the first electrode via the contact hole.

5. The method of claim 1, wherein the inorganic insulation layer is formed within a temperature range of about 150° C. to about 245° C.

6. The method of claim 5, wherein a thickness of the inorganic insulation layer is in a range of about 1000 Å to about 5000 Å.

7. The method of claim 6, wherein the inorganic insulation layer is formed at a deposition rate ranging from about 5 Å/s to about 50 Å/s.

8. The method of claim 1, wherein the uneven structure comprises a plurality of protrusions and a plurality of valleys, and a difference in heights of the protrusions and the valleys is equal to or less than about 500 nm.

9. The method of claim 8, wherein a spacing between adjacent valleys is equal to or less than about 3 μm.

10. The method of claim 9, wherein a root mean square (RMS) roughness value of the uneven structure is in a range of about 10 nm to about 200 nm.

11. The method of claim 1, wherein the organic insulation layer comprises:
   about 65 wt % to about 75 wt % of methyl-3-methoxypropionate; and
   about 10 wt % to about 20 wt % of dipropylene glycol dimethyl ether.

12. The method of claim 1, further comprising:
   forming an insulation layer on the inorganic insulation layer, the insulation layer covering the reflective electrode;
   forming a hydrophobic layer on the insulation layer;
   forming a partition wall on the hydrophobic layer, the partition wall partitioning the pixels;
   disposing an electrowetting layer comprising a first fluid and a second fluid that are immiscible with each other in the pixels, the second fluid having electrical conductivity or polarity;
   forming a second electrode on a second substrate; and
   coupling the first substrate and the second substrate together.

13. A method of fabricating a display device comprising a plurality of pixels, the method comprising:
   forming an organic insulation layer on a first substrate;
   stressing the organic insulation layer via deposition of an inorganic insulation layer on the organic insulation layer, stress of the deposition causing, at least in part, a roughing of an upper surface of the organic insulation layer; and
   forming a conductive material on the inorganic insulation layer,
   wherein an upper surface of the conductive material and an upper surface of the inorganic insulation layer have a roughened upper surface that corresponds to the roughened upper surface of the organic insulation layer, and
   wherein a root mean square roughness value of the roughened upper surface of the organic insulation layer is in a range of about 10 nm to about 200 nm.

* * * * *